(12) United States Patent
French et al.

(10) Patent No.: US 11,790,949 B2
(45) Date of Patent: Oct. 17, 2023

(54) DATA STORAGE DEVICE INTEGRATING WEDGE REPEATABLE RUNOUT (WRRO) LEARNING INTO DATA RECOVERY PROCEDURE (DRP)

(71) Applicant: Western Digital Technologies, Inc., San Jose, CA (US)

(72) Inventors: Jim French, Billings, MT (US); Austin Striegel, Rochester, MN (US); Gary Herbst, San Jose, CA (US); Chuanwen Ji, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/685,184

(22) Filed: Mar. 2, 2022

(65) Prior Publication Data
US 2023/0282237 A1  Sep. 7, 2023

(51) Int. Cl.
*G11B 20/18* (2006.01)
*G11B 27/36* (2006.01)
*G11B 21/10* (2006.01)

(52) U.S. Cl.
CPC ................. *G11B 21/106* (2013.01)

(58) Field of Classification Search
CPC .... G11B 5/00; G11B 5/56; G11B 5/09; G11B 5/596; G11B 27/36; G11B 20/12; G11B 20/18; G11B 2020/183
USPC ..................... 360/48, 77.04, 53, 54
See application file for complete search history.

(56) References Cited

U.S. PATENT DOCUMENTS

| | | |
|---|---|---|
| 5,189,566 A | 2/1993 | Christensen et al. |
| 7,088,535 B2 | 8/2006 | Kim et al. |
| 7,265,923 B2 | 9/2007 | Igari |
| 7,576,941 B1 | 8/2009 | Chen et al. |
| 7,580,212 B1 | 8/2009 | Li et al. |
| 7,595,955 B2 | 9/2009 | Hosono et al. |
| 8,693,134 B1* | 4/2014 | Xi ............. G11B 5/59627 360/48 |
| 9,502,062 B1 | 11/2016 | Dorobantu et al. |
| 2007/0297088 A1 | 12/2007 | Sun et al. |
| 2009/0086364 A1* | 4/2009 | Gerasimov ........ G11B 5/59627 360/77.04 |

OTHER PUBLICATIONS

Wu et al., "Repeatable Runout Compensation for Hard Disk Drives Using Adaptive Feedforward Cancellation", Proceedings of the 2006 American Control Conference, IEEE, pp. 382-387, 2006.

\* cited by examiner

*Primary Examiner* — Nabil Z Hindi
(74) *Attorney, Agent, or Firm* — Neugeboren O'Dowd PC

(57) ABSTRACT

A data storage device comprises a disk having a plurality of data tracks and a plurality of servo wedges wherein the plurality of servo wedges comprise a plurality of wedge repeatable runout (WRRO) fields configured to store a plurality of WRRO compensation values in connection with the plurality of data tracks. The data storage device may also include a read/write head configured to be actuated over the disk, and a controller configured to gather position error signal (PES) data needed for computation of the WRRO compensation values during a field operation of the data storage device. The data storage device may be further configured to adjust a position of the read/write head based on the WRRO compensation values.

18 Claims, 3 Drawing Sheets

DATA STORAGE DEVICE INTEGRATING WEDGE REPEATABLE RUNOUT (WRRO) LEARNING INTO DATA RECOVERY PROCEDURE (DRP)

BACKGROUND

Data storage devices such as disk drives (hard disk drives or HDDs) store data in tracks on the surface of a disk. A typical disk drive includes a transducer, such as a magnetic read/write head, that is held at a carefully controlled fly height over a track on the disk surface while the disk is spun or rotated. The read/write head is connected to the distal end of an actuator arm that is pivoted by an actuator (e.g., a voice coil motor, one or more fine actuators) to radially position the read/write head with respect to the disk.

The disk surface may comprise a plurality of radially spaced data tracks that are partitioned into data sectors. The disk surface may also comprise a plurality of angularly spaced servo wedges that include a servo sector for each data track providing embedded servo information for the track. The servo information may include a pattern of alternating magnetic transitions (servo bursts), which can be read by the head and processed by a servo controller to generate a position error signal (PES) and align the read/write head relative to the desired track. In particular, the servo bursts are written in the servo sector for each track and are precisely located and offset from each side of the track centerline, such that the read/write head is able to stay properly aligned with the track centerline during read/write operations.

Servo sectors may be written on the disk using an external servo writer. Alternatively, a disk drive may self-write the servo sectors on the disk using any suitable technique, such as propagation or while following seed tracks, such as spiral tracks. Regardless of how the servo sectors are written on the disk, errors such as vibration may occur in the servo writing process resulting in the servo sectors defining eccentric tracks that deviate from concentric circular tracks. That is, imperfections relative to ideal (i.e., perfectly circular) tracks may occur in the servo write process. This eccentricity is referred to as repeatable runout (RRO), or wedge repeatable runout (WRRO), since the positioning errors created by the imperfect tracks repeat each time the disk rotates.

To compensate for WRRO, PES data is gathered for each data track, and WRRO compensation values are generated from the PES data and written to the servo sector for each track. During read/write operations, these WRRO compensation values are read from the disk and processed by the servo controller to adjust the read/write head position such that it remains aligned with the track centerline. Typically, the process of measuring, generating, and writing WRRO compensation values to the servo sector for each track is performed during a series of tests at the factory during the disk drive manufacturing process. This process is time consuming, often requiring multiple revolutions of the disk for each track to learn the WRRO associated with that track and to generate and write WRRO compensation values to the servo sector for that track. The time and equipment required to conduct WRRO learning introduces substantial expense into the disk drive manufacturing process.

SUMMARY

Various aspects disclosed herein provide data storage devices, systems and methods in which a WRRO learning process is performed during a field operation of the data storage device, in particular, the WRRO learning process is integrated into a data recovery procedure (DRP) that is performed when an error condition such as a write inhibit condition or a read inhibit condition occurs.

Various illustrative aspects are directed to a data storage device comprising a disk having a plurality of data tracks and a plurality of servo wedges, wherein the plurality of servo wedges comprise a plurality of wedge repeatable runout (WRRO) fields configured to store a plurality of WRRO compensation values in connection with the plurality of data tracks. The data storage device may also include a read/write head configured to be actuated over the disk, and a controller configured to gather position error signal (PES) data needed for computation of the WRRO compensation values during a field operation of the data storage device. The data storage device may be further configured to adjust a position of the read/write head based on the WRRO compensation values.

Various other aspects are directed to a method for performing a wedge repeatable runout (WRRO) learning process for a data storage device wherein the method comprises actuating a read/write head over a data track of a disk of a data storage device to perform a read operation or a write operation, detecting an error condition while performing the read operation or the write operation, performing a data recovery procedure (DRP) to resolve the error condition, and while the DRP is being performed, controlling the read/write head to gather position error signal (PES) data needed for computation of WRRO compensation values. Additional aspects are directed to a data storage device comprising means for storing a plurality of wedge repeatable runout (WRRO) compensation values in association with a plurality of data tracks on a disk, means for gathering position error signal (PES) data needed for computation of the WRRO compensation values during a field operation of the data storage device, and means for adjusting a position of a read/write head for writing data to and reading data from the disk based on the WRRO compensation values.

Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and from the accompanying drawings. The drawings are not necessarily to scale; emphasis instead is placed on illustrating the principles of the technological concepts. In the drawings, like reference characters may refer to the same parts throughout the different views. The drawings depict only illustrative examples of this disclosure and are not limiting in scope.

DETAILED DESCRIPTION

Figures 1A, 1B:
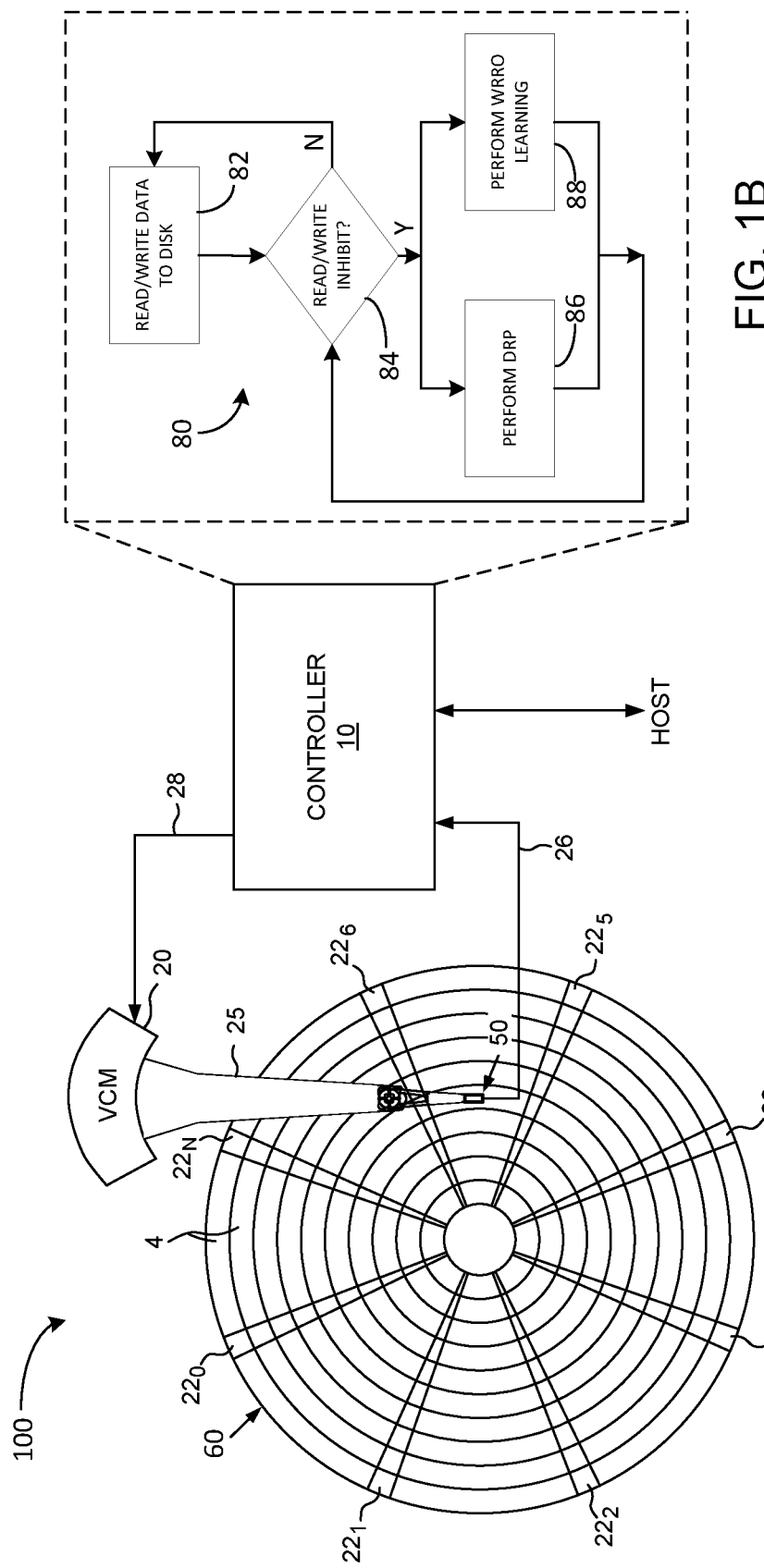
FIG. 1A is a conceptual block diagram of a disk drive, in accordance with aspects of this disclosure.
FIG. 1B is a flowchart of a method that a data storage device may perform, execute, and implement, in accordance with aspects of this disclosure.

FIG. 1A is a block diagram of a disk drive 100, in accordance with aspects of this disclosure. Disk drive 100 comprises a recording medium, such as a disk 60, and a magnetic read-write head 50 connected to the distal end of an actuator arm 25. Read-write head 50, which may also be referred to as a transducer, includes a write element and a read element for respectively writing and reading information stored on disk 60. Actuator arm 25 is rotated about a pivot by a voice coil motor (VCM) 20 to position head 50 radially over disk 60. Disk drive 100 also includes a spindle and a spindle motor (not shown) for rotating disk 60 during read/write operations.

Disk drive 100 also comprises a controller 10 that performs various operations of disk drive 100 described herein. In one aspect of this disclosure, controller 10 executes the method 80 shown in the flow diagram of FIG. 1B to perform WRRO learning during a data recovery procedure (DRP) executed after an error condition such as a write inhibit condition or a read inhibit condition occurs, as will be explained in detail below. Controller 10 may be implemented using one or more processors for executing instructions and may further include a volatile or non-volatile memory for storing data (e.g., data being processed) and/or instructions. The instructions may be executed by the one or more processors to perform the various functions of controller 10 described herein. The one or more processors may include, for example, a microcontroller, a Digital Signal Processor (DSP), an Application Specific Integrated Circuit (ASIC), a Field Programmable Gate Array (FPGA), hardwired logic, analog circuitry and/or a combination thereof.

Disk 60 comprises a plurality of radially spaced data tracks 4. Each track 4 may be divided into a plurality of data sectors (not shown) that are spaced circumferentially along the track 4. User data and/or other information may be stored in the data sectors. To write data to disk 60, controller 10 may first position head 50 over a desired track 4 on disk 60. Controller 10 processes data to be written to disk 60 into a write signal 26, which is outputted to head 50. Head 50 converts write signal 26 into a magnetic field that magnetizes the surface of disk 60 based on write signal 26, thereby magnetically writing the data onto disk 60. To read data from disk 60, controller 10 positions head 50 over a desired track 4 on disk 60. Head 50 generates a read signal 26 based on the magnetization of the disk surface under head 50. Controller 10 receives and processes read signal 26 into data, thereby reading the data from disk 60.

Disk 60 may also comprise a plurality of angularly spaced servo wedges $22_0$-$22_N$, where each servo wedge may include a servo sector for each data track 4 providing embedded servo information for the track. The servo information for each track may include a pattern of alternating magnetic transitions (servo burst), which may be read from disk 60 by head 50 and processed by controller 10 to determine the position of head 50 relative to the corresponding track 4. Each servo sector may also include wedge repeatable runout (WRRO) compensation values to compensate for repeatable runout. The angular spacing between servo wedges $22_0$-$22_N$ may be uniform, as shown in the example of FIG. 1A.

Figure 2:
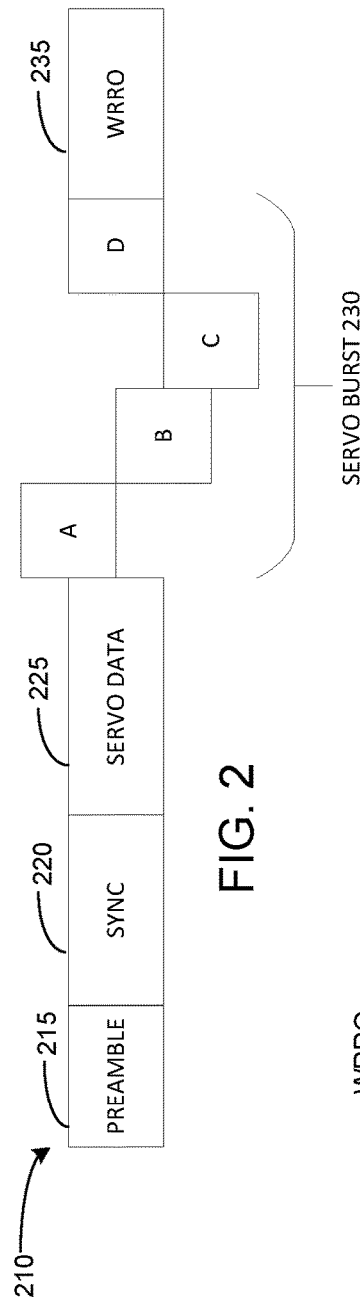
FIG. 2 is a conceptual block diagram of a servo sector, in accordance with aspects of this disclosure.

FIG. 2 shows an example of a servo sector 210 in a servo wedge $22_0$-$22_N$ for a track 4, in accordance with aspects of this disclosure. Servo sector 210 may include a preamble field 215, a servo synch mark field 220, and a servo data field 225, which may include track identification and/or other data. Servo sector 210 may also include a servo burst field 230 comprising a pattern of alternating magnetic transitions (A, B, C, D) that are read by head 50 and processed by controller 10 to determine the position of head 50 relative to track 4. Servo sector 210 may further include a WRRO field 235 comprising one or more WRRO compensation values that are read by head 50 and processed by controller 10 to compensate for repeatable runout (RRO) associated with the track.

Controller 10 may use the servo information in servo wedges $22_0$-$22_N$ to keep head 50 on a desired track during track following. To do this, controller 10 may read servo information (e.g., servo burst 230) each time head 50 passes over a servo wedge $22_0$-$22_N$, process the read servo information to determine the position of head 50, and generate a position error signal (PES) indicating the deviation of the head position from the desired track 4. Controller 10 may also read the WRRO compensation values from servo wedges $22_0$-$22_N$ to compensate for repeatable runout associated with the track. Controller 10 may then generate a control signal 28 based on the PES and WRRO compensation values and output control signal 28 to VCM 20 to adjust the position of head 50 in a direction that keeps head 50 on track.

Figure 3:
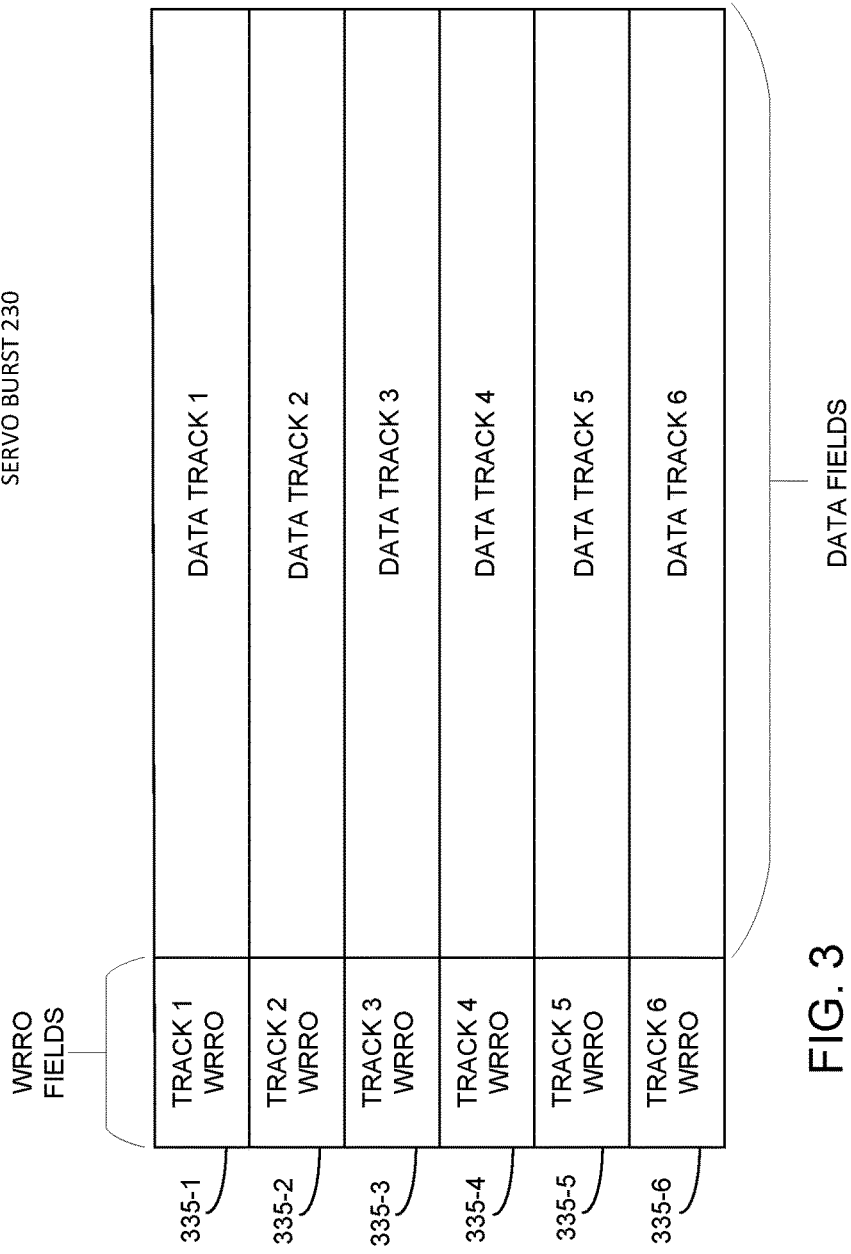
FIG. 3 is a conceptual block diagram of a WRRO layout on a disk, in accordance with aspects of this disclosure.

FIG. 3 illustrates an example of a conventional WRRO layout on a disk, in accordance with aspects of this disclosure. More particularly, FIG. 3 shows an example of data fields for six data tracks 1-6. The data field for each track includes one or more data sectors and corresponds to a portion of the track between adjacent servo wedges. FIG. 3 also shows an example of six WRRO fields 335-1 to 335-6, where each WRRO field 335-1 to 335-6 is associated with a corresponding one of data tracks 1-6. Each of WRRO fields 335-1 to 335-6 may include one or more WRRO compensation values to compensate for repeatable runout for the corresponding data track. For example, WRRO field 335-1 may include one or more WRRO compensation values for Track 1. WRRO fields 335-1 to 335-6 shown in FIG. 3 are located in a servo wedge.

Figures 4, 5:
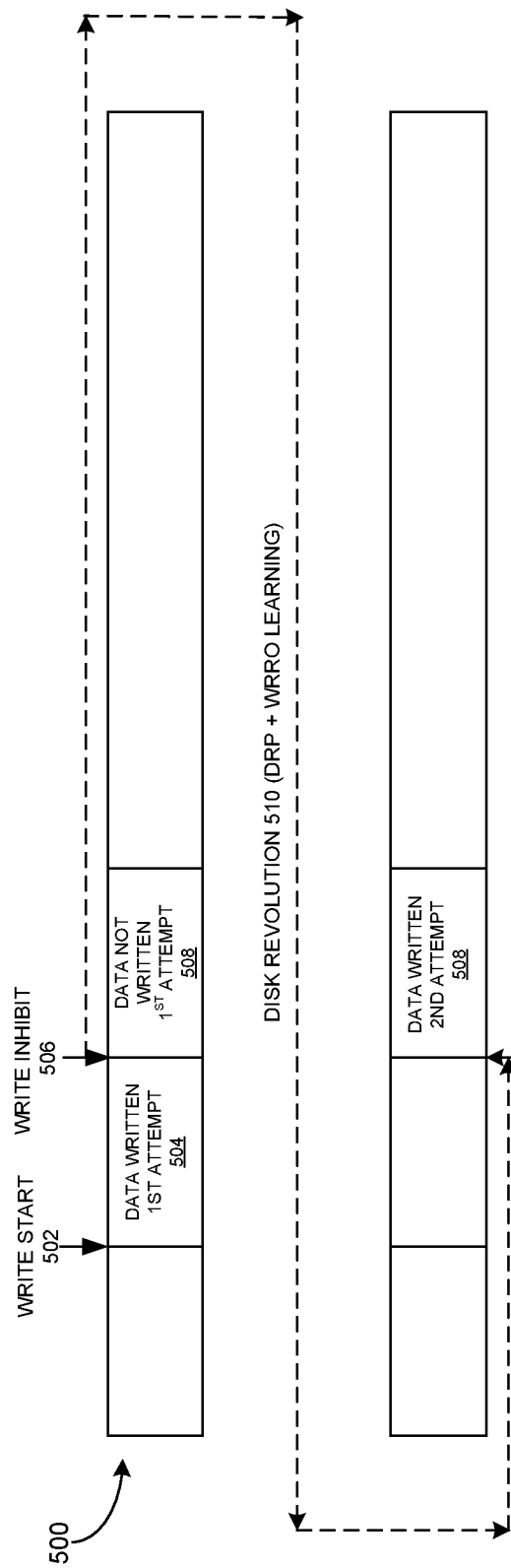
FIG. 4 is a conceptual block diagram of WRRO fields in a WRRO layout on a disk, in accordance with aspects of this disclosure.
FIG. 5 is a conceptual block diagram of a data track on which WRRO learning is performed during a data recovery procedure (DRP) step executed after a write inhibit condition occurs, according to aspects of this disclosure.

FIG. 4 shows an example of WRRO fields 335-1 to 335-6 in the conventional WRRO layout in more detail. As shown in FIG. 4, each WRRO field 335-1 to 335-6 may include a WRRO preamble and two WRRO compensation values W1 and W2. WRRO compensation values W1 and W2 provide WRRO compensation for a portion of the corresponding track extending to the next two servo wedges, as discussed above. The WRRO preamble for each WRRO field 335-1 to 335-6 provides timing information that allows controller 10 to synchronize with the timing of the bits of WRRO compensation values W1 and W2 in order to read WRRO compensation values W1 and W2. The WRRO preamble should not be confused with preamble 215 of the corresponding servo sector.

The WRRO compensation values are typically learned and written to the disk in the factory as part of the disk drive manufacturing process. According to aspects of this disclosure, some or all of the WRRO learning process may be performed during a field operation of the disk drive and may be integrated into customer usage time, rather than (or in supplement to) performing the WRRO learning process in the factory. In the following description, the term "field operation" means an operation of the disk drive that is performed during operation by a user and after the disk drive manufacturing process is complete. The WRRO learning process can be lengthy and can entail significant expenditures on factory test equipment needed for the learning process. This expense and time can be reduced or eliminated by partially or wholly integrating the WRRO learning process into a field operation(s) of the disk drive. Moreover, the WRRO learning process is typically performed in a factory at a particular temperature and operating environment that may be quite different than the temperature and operating environment in which the disk drive is deployed in the field. The ability to learn WRRO in the temperature and operating environment in which the disk drive is deployed can improve performance and make the product more robust.

In accordance with aspects of this disclosure, the WRRO learning process is integrated into a field operation that is performed during normal operation of the disk drive. In one aspect, the WRRO learning process is integrated into a data recovery procedure (DRP) that is performed or invoked when an error condition occurs, such as a write inhibit condition or a read inhibit condition. The DRP is a procedure that the disk drive dynamically invokes to recover data from, or write data to, a data sector or sectors that head 50 was not able to write data to or read data from. There may be hundreds of possible DRP steps available to be invoked, some of which generally involves an additional revolution of the disk to retry the writing/reading operation after some adjustment to reading/writing parameters is made. The adjustment may be as simple as an additional attempt to write/read data, or may involve additional adjustments of varying complexity such as recalibration, changing use of filters, etc. Regardless of which particular DRP steps are invoked, each step that is attempted involves an additional revolution of the disk in order to return to the data sector in which the read/write inhibit was encountered, such that the failed read or write operation can be retried. Thus, the disk may be rotated multiple times until a configuration is found that allows the attempted read or write operation to be completed.

While these revolutions of the disk are necessary to return to the problematic data sector(s) such that the read or write operation may be retried after an appropriate adjustment is made, the time needed to perform the disk revolution is essentially idle or dead time in the sense that it cannot be spent to service other access requests. According to aspects of this disclosure, a WRRO learning process is carried out during revolutions of the disk that are performed during the data recovery procedure (DRP). The DRP may be performed after an error condition such as a write inhibit condition or a read inhibit condition occurs. In particular, the position error signal (PES) data needed to compute WRRO compensation values is gathered during a disk revolution(s) that is performed during a DRP performed after an error condition such as a write inhibit condition or a read inhibit condition.

In one aspect of this disclosure, controller 10 (FIG. 1A) executes the method 80 shown in the flow diagram of FIG. 1B to perform WRRO learning during a DRP executed after an error condition such as a write inhibit condition or a read inhibit condition occurs. In step 82, as described with reference to FIG. 1A, data is written to or read from a desired data track 4 of a recording medium of a data storage device, such as disk 60 of disk drive 100.

In step 84, controller 10 determines whether a write inhibit condition, a read inhibit condition, or some other error condition has occurred that requires invocation of a data recovery procedure (DRP). If such an error condition has not occurred, the process returns to step 82, and controller 10 controls head 50 to write additional data to or read additional data from the desired track 4. If an error condition such as write inhibit or read inhibit has occurred in step 84, a DRP is initiated by controller 10 in step 86. As described above, DRP generally involves one or more steps in which some adjustment to read/write parameters is made, and a revolution of the disk is made to return to the error location and retry the writing/reading operation. The adjustment may be as simple as an additional attempt to write/read data, or may involve additional adjustments of varying complexity such as recalibration, changing use of filters, etc.

In step 88, when controller 10 initiates DRP in step 86, controller 10 also initiates a WRRO learning process. In particular, during the revolution of disk 60 while returning to the track location where the error condition occurred for a retry of the read or write operation, controller 10 controls head 50 to collect the position error signals (PES) needed for computation of the WRRO compensation values for the track 4 that data is being written to or read from. Upon a complete revolution of disk 60 back to the track location where the error condition occurred, the process returns to step 84 to retry the writing/reading operation. If the retry of the read/write operation is successful, the process returns to step 82 to write additional data to or read additional data from disk 60. If the retry of the read/write operation is not successful, DRP step 86 (typically with further adjustments) and WRRO learning step 88 are repeated, and the read/write operation is retried again in step 84. This process continues until data is successfully written to or read from disk 60 in step 84, or until it is determined that the error condition cannot be resolved by the DRP.

FIG. 5 is a conceptual block diagram of a data track 500 on which WRRO learning is performed during DRP after a write inhibit condition occurs, according to aspects of this disclosure. Although a write inhibit condition is illustrated, the same or a similar procedure is carried out for a read inhibit condition or other error condition. At location 502 of data track 500 (of a disk 60, for example), controller 10 initiates writing of a first data sector 504, which (in the example of FIG. 5) is successfully written to data track 500. At location 506, controller 10 initiates writing of a second data sector 508, and a write inhibit condition occurs. Thus, data sector 508 is not successfully written to track 500 on the first attempt, and DRP (step 86 of method 80) is initiated to make an adjustment to the write parameters and to make a complete revolution 510 of disk 60 to return head 50 to location 506 of track 500 (where the error condition occurred) such that the writing of second data sector 508 can be retried.

When controller 10 initiates DRP step 86 (at location 506 of track 500), and once drive 60 is re-settled, controller 10 initiates WRRO learning step 88. Thus, during revolution 510 of disk 60 to return to track location 506 where the write inhibit condition occurred for a retry of the write operation, and while DRP is being performed, controller 10 controls head 50 to collect the PES data needed for computation of the WRRO compensation values for track 500. Once the revolution 510 of disk 60 is complete, and whether or not the write retry is successful, PES data for a full revolution of track 500 has been collected and can be utilized for any desired purpose, such as computation of WRRO compensation values.

The PES data collected for computation of WRRO compensation values during WRRO learning step 88 may be used for various purposes. For example, the WRRO compensation values that have just been learned and computed on the fly may be used in subsequent read/write retry attempts as updated WRRO compensation values in place of the original WRRO compensation values computed and written to the disk during the disk drive manufacturing process. WRRO is learned in the factory in a certain set of conditions: temperature, operating environment, acoustics, etc. These conditions may substantially differ from the actual operating conditions of the drive as deployed in the field, and the use of updated WRRO compensation values measured and computed during actual operation of the drive may produce more accurate positioning of the head and improve the efficiency of read/write operations.

In addition, the WRRO values learned and computed in connection with DRP may be stored for future operations on that same track. In effect, operations of the drive may improve over time as WRRO values are continually learned and updated during DRP steps. Further, integration of WRRO learning into DRP may substantially or completely replace WRRO learning in the factory altogether, thereby providing significant cost and time savings, and providing more accurate WRRO values that reflect the actual conditions in which the disk drive is operating. Alternatively, the WRRO values may be stored for future use or operations on another media than the media itself, such as a flash or NAND memory element.

Any suitable controller or control circuitry may be employed to implement the methods and processes in the above examples, such as any suitable integrated circuit or circuits. For example, the controller or control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the controller or control circuitry may include a preamp circuit implemented as a separate integrated circuit, integrated into the read channel or data storage controller circuit, or integrated into an SoC.

In some examples, the controller or control circuitry comprises a microprocessor executing instructions, the instructions being operable to cause the microprocessor to perform the methods, processes and flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the controller or control circuitry comprises suitable logic circuitry, such as state machine circuitry. In some examples, at least some of the methods, processes and flow diagrams may be implemented using analog circuitry (e.g., analog comparators, timers, etc.), and in other examples at least some of the methods, processes and flow diagrams may be implemented using digital circuitry or a combination of analog and digital circuitry.

In various examples, one or more processing devices may comprise or constitute the controller or control circuitry as described herein, and/or may perform one or more of the functions of the controller or control circuitry as described herein. In various examples, the controller or control circuitry, or other one or more processing devices performing one or more of the functions of the controller or control circuitry as described herein, may be abstracted away from being physically proximate to the disks and disk surfaces. The controller or control circuitry, or other one or more processing devices performing one or more of the functions of the controller or control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drives. In addition, some examples may include electronic devices such as computing devices, data server devices, media content storage devices, or other devices, components, or systems that may comprise the storage media, controller and/or control circuitry as described above.

The various features and processes described above may be used independently of one another or may be combined in various ways. All possible combinations and subcombinations fall within the scope of this disclosure. In addition, certain method, event, or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of this disclosure. Thus, nothing in the foregoing description implies that any feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of this disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for WRRO learning, and other aspects of this disclosure. Persons skilled in the relevant fields of art will be well-equipped by this disclosure with an understanding and an informed reduction to practice of a wide panoply of further applications, architectures, techniques, and methods for WRRO learning and other aspects of this disclosure encompassed by the present disclosure and by the claims set forth below.

As used herein, the recitation of "at least one of A, B and C" means "either A, B, C or any combination of A, B and C." The descriptions of the disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While this disclosure has been described with reference to various examples, it will be understood that these examples are illustrative and that the scope of the disclosure is not limited to them. All subject matter described herein are presented in the form of illustrative, non-limiting examples, and not as exclusive implementations, whether they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently in various examples of the disclosure or described with different terminology, without departing from the spirit and scope of this disclosure and the following claims. These and other variations, modifications, additions, and improvements may fall within the scope of the disclosure as defined in the claims that follow.

What is claimed is:

1. A data storage device comprising:
   a disk comprising a plurality of data tracks and a plurality of servo wedges, wherein the plurality of servo wedges comprise a plurality of wedge repeatable runout (WRRO) fields configured to store a plurality of WRRO compensation values in connection with the plurality of data tracks;
   a read-write head configured to be actuated over the disk; and
   a controller configured to:
      gather position error signal (PES) data needed for computation of the WRRO compensation values during a field operation of the data storage device during a data recovery procedure (DRP) that is invoked when an error condition occurs, and
      adjust a position of the read-write head based on the WRRO compensation values.

2. The data storage device of claim 1, wherein the field operation comprises a complete revolution of the disk.

3. The data storage device of claim 1, wherein the error condition is a write inhibit condition or a read inhibit condition.

4. The data storage device of claim 3, wherein the controller is further configured to compute updated WRRO compensation values from the PES data gathered during the DRP and to use the updated WRRO compensation values in a retry of a write operation or a read operation.

5. The data storage device of claim 4, wherein the controller is further configured to store the updated WRRO compensation values for future operations.

6. The data storage device of claim 4, wherein the controller is further configured to replace original WRRO compensation values computed during a manufacturing process of the data storage device with the updated WRRO compensation values.

7. A method for performing a wedge repeatable runout (WRRO) learning process for a data storage device, comprising:
   actuating a read-write head over a data track of a disk of a data storage device to perform a read operation or a write operation;
   detecting an error condition while performing the read operation or the write operation;
   performing a data recovery procedure (DRP) to resolve the error condition; and
   while the DRP is being performed, controlling the read-write head to gather position error signal (PES) data needed for computation of WRRO compensation values.

8. The method of claim 7, wherein performing the DRP comprises effecting a complete revolution of the disk.

9. The method of claim 7, wherein the error condition is a write inhibit condition or a read inhibit condition.

10. The method of claim 9, further comprising:
    computing updated WRRO compensation values from the PES data gathered during the DRP; and
    using the updated WRRO compensation values in a retry of the read operation or the write operation.

11. The method of claim 10, further comprising:
    storing the updated WRRO compensation values for future operations on the data track.

12. The method of claim 10, further comprising:
    replacing original WRRO compensation values computed during a manufacturing process of the data storage device with the updated WRRO compensation values.

13. A data storage device comprising:
    means for storing a plurality of wedge repeatable runout (WRRO) compensation values in association with a plurality of data tracks on a disk;
    means for gathering position error signal (PES) data needed for computation of the WRRO compensation values during a field operation of the data storage device, and wherein the means for gathering the PES data is configured to gather the PES data during a data recovery procedure (DRP) that is invoked when an error condition occurs; and
    means for adjusting a position of a read-write head for writing data to and reading data from the disk based on the WRRO compensation values.

14. The data storage device of claim 13, wherein the field operation comprises a complete revolution of the disk.

15. The data storage device of claim 13, wherein the error condition is a write inhibit condition or a read inhibit condition.

16. The data storage device of claim 15, further comprising:
    means for computing updated WRRO compensation values from the PES data gathered during the DRP; and means for using the updated WRRO compensation values in a retry of a write operation or a read operation.

17. The data storage device of claim 16, further comprising means for storing the updated WRRO compensation values for future operations.

18. The data storage device of claim 16, further comprising means for replacing an original WRRO compensation value computed during a manufacturing process of the data storage device with the updated WRRO compensation values.

* * * * *